United States Patent
Bhogal et al.

(10) Patent No.: US 9,830,477 B2
(45) Date of Patent: *Nov. 28, 2017

(54) AUDIENCE-BASED SENSITIVE INFORMATION HANDLING FOR SHARED COLLABORATIVE DOCUMENTS

(71) Applicant: INTERNATIONAL BUSINESS MACHINES CORPORATION, Armonk, NY (US)

(72) Inventors: Kulvir S. Bhogal, Fort Worth, TX (US); Jonathan F. Brunn, Logan, UT (US); Jeffrey R. Hoy, Southern Pines, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,125

(22) Filed: Mar. 3, 2017

(65) Prior Publication Data

US 2017/0177906 A1 Jun. 22, 2017

Related U.S. Application Data

(63) Continuation of application No. 15/155,877, filed on May 16, 2016, which is a continuation of application No. 14/702,200, filed on May 1, 2015.

(51) Int. Cl.
*G06F 21/62* (2013.01)
*G06F 17/30* (2006.01)
*G06F 17/24* (2006.01)

(52) U.S. Cl.
CPC .......... *G06F 21/6254* (2013.01); *G06F 17/24* (2013.01); *G06F 17/30011* (2013.01); *G06F 21/6209* (2013.01)

(58) Field of Classification Search
None
See application file for complete search history.

(56) References Cited

U.S. PATENT DOCUMENTS 5,293,633 A 3/1994 Robbins
5,379,297 A 1/1995 Glover et al.
(Continued)

FOREIGN PATENT DOCUMENTS

WO 2006137057 A2 12/2006
WO 2011098749 A2 8/2011
WO 2014113136 A1 7/2014

OTHER PUBLICATIONS

Internet Society Requests for Comment (RFCS), et al.; "Redaction of Potentially Sensitive Data from Mail Abuse Reports (RFC6590)," ip.com, 2012, <http://null/IPCOM/000216449>; 17 pages.

(Continued)

*Primary Examiner* — Christopher Revak
(74) *Attorney, Agent, or Firm* — Peter B. Stewart; Moore & Van Allen PLLC

(57) ABSTRACT

A method for providing audience-based redaction of sensitive information in an electronic document may include receiving a request from a computing device to access an electronic document, retrieving the electronic document, identifying the user(s) associated with the computing device, determining an access level for each user associated with the computing device, determining the lowest access level for the user(s) associated with the computing device, generating a rendering of the electronic document for display on the computing device based on the lowest access level for the user(s) associated with the computing device, and providing the rendering of the electronic document to the computing device for display. When generating the rendering of the electronic document for display, sensitive information in the (Continued)

electronic document is typically redacted based on the lowest access level for the user(s) associated with the computing device.

7 Claims, 3 Drawing Sheets

(56) References Cited

U.S. PATENT DOCUMENTS

| | | | |
|---|---|---|---|
| 6,252,869 B1 | 6/2001 | Silverman | |
| 6,427,151 B1 | 7/2002 | Chan et al. | |
| 6,563,430 B1 | 5/2003 | Kemink et al. | |
| 7,069,345 B2 | 6/2006 | Shteyn | |
| 7,162,525 B2 | 1/2007 | Cofta et al. | |
| 7,240,214 B2 | 7/2007 | Gazzetta et al. | |
| 7,433,335 B2 | 10/2008 | Bi et al. | |
| 7,552,467 B2 | 6/2009 | Lindsay | |
| 7,587,051 B2 | 9/2009 | Bisson et al. | |
| 7,609,716 B2 | 10/2009 | Brown et al. | |
| 7,681,527 B2 | 3/2010 | Pratt | |
| 7,810,451 B2 | 10/2010 | Pratt | |
| 7,836,850 B2 | 11/2010 | Pratt | |
| 7,873,071 B2 | 1/2011 | Ung et al. | |
| 7,890,612 B2 | 2/2011 | Todd et al. | |
| 7,984,169 B2 | 7/2011 | Brunell et al. | |
| 8,037,846 B2 | 10/2011 | Pratt | |
| 8,256,381 B2 | 9/2012 | Pratt | |
| 8,271,598 B2 | 9/2012 | Guy et al. | |
| 8,307,331 B2 | 11/2012 | Warila et al. | |
| 8,458,349 B2 | 6/2013 | Brunell et al. | |
| 8,505,488 B2 | 8/2013 | Pratt | |
| 8,781,923 B2 | 7/2014 | Pitroda et al. | |
| 8,838,956 B2 | 9/2014 | Bettger et al. | |
| 9,003,551 B2 | 4/2015 | Hoyer | |
| 9,070,127 B2 | 6/2015 | Pitroda et al. | |
| 2009/0313074 A1 | 12/2009 | Harpur et al. | |
| 2009/0323087 A1 | 12/2009 | Luo | |
| 2010/0313239 A1 | 12/2010 | Chakra et al. | |
| 2011/0023129 A1 | 1/2011 | Vernal et al. | |
| 2011/0219081 A1 | 9/2011 | Parthasarathy et al. | |
| 2013/0166657 A1 | 6/2013 | Tadayon | |
| 2013/0304827 A1 | 11/2013 | Bastide et al. | |
| 2013/0339462 A1 | 12/2013 | Manning et al. | |
| 2014/0283142 A1 | 9/2014 | Shepherd et al. | |
| 2014/0325341 A1 | 10/2014 | Richter et al. | |
| 2014/0379598 A1 | 12/2014 | Perrone et al. | |
| 2015/0082391 A1 | 3/2015 | Lerman et al. | |
| 2015/0358266 A1 | 12/2015 | Kaplinger et al. | |
| 2015/0365422 A1 | 12/2015 | Peterson et al. | |
| 2016/0065577 A1 | 3/2016 | Tran et al. | |
| 2016/0119364 A1 | 4/2016 | Zolli | |
| 2016/0182526 A1 | 6/2016 | Underwood et al. | |
| 2016/0205105 A1 | 7/2016 | Nainwal | |
| 2016/0321462 A1* | 11/2016 | Bhogal | G06F 17/24 |
| 2016/0321469 A1* | 11/2016 | Bhogal | G06F 17/24 |

OTHER PUBLICATIONS

Quiver Software Limited; "Prevent Email Breaches with Data Science," CheckRecipient, 2015, pp. 1-6.

Keating, Katie; "Do You Really Want to Share That? Eliminating the Social Media Faux Pas," Building a Smarter Planet. A Smarter Planet Blog. 2015, pp. 1-14, downloaded from the Internet Apr. 19, 2016: <http://asmarterplanet.com/blog/2015/01/really-want-share-eliminating-social-faux-pas.html>.

Anonymous; "Altering Scanned Documents for Redaction, Masking and other Edit Operations," ip.com, 2014, <http://null/IPCOM/000234883>; 7 pages.

Anonymous, "The Partial Content Editing Mechanism for Social Network," ip.com, 2013, <http://null/IPCOM/000227737>; 6 pages.

International Business Machines Corporation, "List of IBM Patents or Patent Applications Treated as Related," submitted Mar. 6, 2017, 2 Pages.

U.S. Appl. No. 15/155,877, filed May 16, 2016, now, Pending.

U.S. Appl. No. 14/702,200, filed May 1, 2015, now, Pending.

* cited by examiner

AUDIENCE-BASED SENSITIVE INFORMATION HANDLING FOR SHARED COLLABORATIVE DOCUMENTS

CROSS-REFERENCE TO RELATED APPLICATIONS

This application is a continuation application of U.S. patent application Ser. No. 15/155,877 (filed May 16, 2016), which published on Nov. 3, 2016, as U.S. Patent Application Publication No. 2016/0321469, which itself is a continuation of U.S. patent application Ser. No. 14/702,200 (filed May 1, 2015), which published on Nov. 3, 2016, as U.S. Patent Application Publication No. 2016/0321462. Each of the foregoing patent applications and publications is hereby incorporated by reference in its entirety.

BACKGROUND

Aspects of the present invention relate to a system for providing a collaborative editing environment. Collaborative editing environments enable multiple users to edit the same electronic document. That said, a need exists for an improved collaborative editing system.

SUMMARY

In one aspect, the present invention embraces a method for providing audience-based redaction of sensitive information in an electronic document and an associated system and computer program product.

In one embodiment, the method includes receiving a request from a first computing device to access a first electronic document stored in a document database, the first electronic document comprising first sensitive data, wherein a first user is associated with the first electronic document. The first electronic document is retrieved from the document database. One or more users associated with the first computing device are identified. Based on identifying the one or more users associated with the first computing device, an access level for each of the one or more users associated with the first computing device is determined. This determination is further based on determining a social network relationship between the first user and the one or more users associated with the first computing device. Based on determining the access level for each of the one or more users associated with the first computing device, a weakest access level for the one or more users associated with the first computing device is determined. A first rendering of the first electronic document is created. This rendering is created by redacting the first sensitive data from the first electronic document based on the weakest access level for the one or more users associated with the first computing device. The rendering of the first electronic document is provided to the first computing device for display. The associated system and computer program product may be configured to perform the steps of the method.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
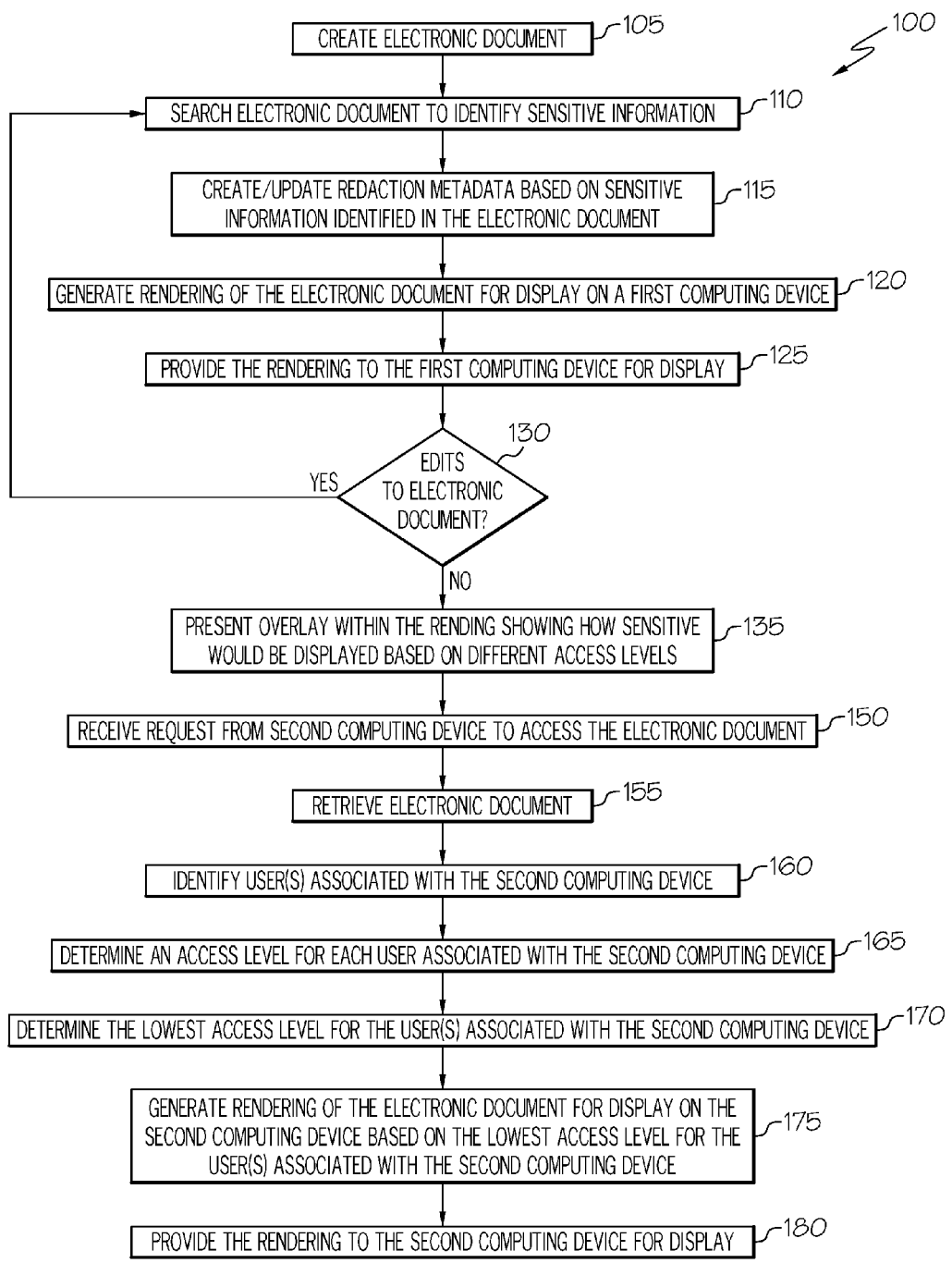
FIG. 1 depicts an exemplary method for providing audience-based redaction of sensitive information in an electronic document in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In one aspect, the present invention embraces a method for providing audience-based redaction of sensitive information in an electronic document. In this regard, FIG. 1 depicts an exemplary method 100 for providing audience-based redaction of sensitive information in an electronic document.

Accordingly, at block 105, an electronic document is created within a collaborative editing system. In this regard, a first user may use a computing device to access the collaborative editing system via a communication network and request that the electronic document be created. In some embodiments, the first user may be required to authenticate his/her identity using a user name, a passcode, a cookie, a biometric identifier, a private key, a token, and/or another authentication mechanism before being allowed to access the collaborative editing system or create the electronic document.

To create the electronic document, the first user may activate a "create new document" button or icon, may activate a "save existing document" button or icon, or may otherwise request that the collaborative editing system create the electronic document. Thereafter, the collaborative editing system may create the electronic document, such as by creating a blank document or by receiving an existing document uploaded by the first user. The collaborative editing system then typically stores the electronic document in a document database.

When the electronic document is created, the collaborative editing system typically creates metadata defining those users with rights to access and edit the electronic document. Typically, the collaborative editing system will automatically designate the creator of the electronic document (e.g., the first user) as an owner and/or editor of the electronic document. Other users may also be automatically given access and editing rights. For example, if the electronic document is created within a particular collaborative environment provided by the collaborative editing system for a group of users, each member of that group may be designated as an owner and/or editor of the electronic document.

At block 110, the collaborative editing system automatically searches the electronic document to identify any sensitive information in the document. In this regard, the collaborative editing system may run search queries in the electronic document for words, phrases, and/or other information that may be sensitive. This searching may be performed based on redaction rules that specify a search algorithm, which may include key words and/or phrases, for identifying potentially sensitive information. In some embodiments, the collaborative editing system may search for information that can be used to identify a particular person, such as a name, address, or other personally identifiable information. In some embodiments, the collaborative editing system may search for sensitive business information related to the entity that operates the collaborative editing system. In some embodiments, the collaborative editing system may search for sensitive information based on redaction rules provided by a user of the collaborative editing system, such as an owner or authorized editor of the electronic document.

Next, at block 115, the collaborative editing system typically creates redaction metadata based on sensitive information in the electronic document. This redaction metadata typically identifies the sensitive information in the electronic document so that this sensitive information can later be redacted. This redaction metadata also typically specifies required access levels for sensitive information. For example, the redaction metadata may specify that only owners or authorized editors of the electronic document can view certain sensitive data and that such sensitive data will be redacted for other users. In some embodiments, different pieces of sensitive data may have different required access levels. In some embodiments, the redaction metadata may specify how sensitive data will be displayed, which may differ for different access levels. For example, a name "First M. Last" may be unredacted for document owners/authorized editors, redacted and displayed as "XXXXX X. XXXX" for an intermediate access level, and redacted and displayed as "******" for a lowest access level.

The redaction metadata may be automatically created based on default rules contained in the redaction rules. For example, the redaction rules may specify required access levels for one or more types of sensitive information. The redaction rules may also specify how sensitive data will be displayed (e.g., when it is redacted). The collaborative editing system may save the redaction metadata to the electronic document or may save redaction metadata within a separate electronic file.

Figure 2:
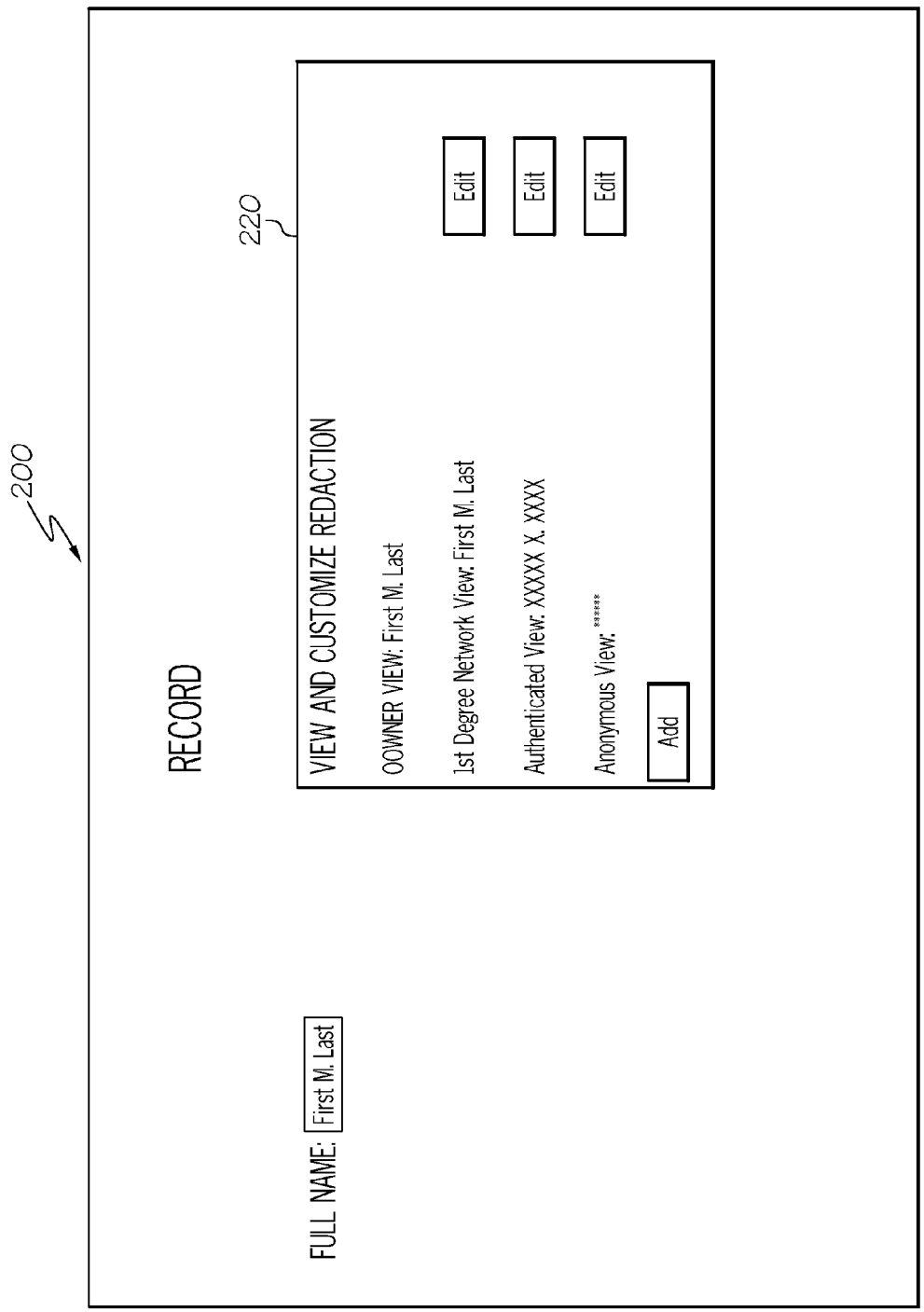
FIG. 2 is an exemplary rendering of an electronic document in accordance with an embodiment of the present invention.

At block 120, the collaborative editing system generates a rendering of the electronic document for display on the first user's computing device. Because the first user is typically defined as an owner or authorized editor, sensitive information is typically not redacted in this rendering. That said, this rendering typically identifies any sensitive information. For example, when the collaborative editing system generates the rendering, the collaborative editing system may highlight, alter the font color, or otherwise alter the electronic document in a way that identifies sensitive information (e.g., based on information that the redaction metadata identifies as sensitive). In this regard, FIG. 2 depicts an exemplary rendering 200 in which the name "First M. Last" is highlighted to identify it as being potentially sensitive.

At block 125, the collaborative editing system provides this rendering to the first user's computing device for display (e.g., via a graphical user interface (GUI) provided by the collaborative editing system to the first user's computing device).

At block 130, the collaborative editing system determines if any edits have been made to the electronic document. For example, the collaborative editing system may receive an edit to the electronic document from the first user. In this regard, the first user may edit the electronic document by using a graphical user interface provided by the collaborative editing system to the first user's computing device. In addition, the collaborative editing system may receive edits to the electronic document from other users that are owners or authorized editors of the electronic document. If any edits to the electronic document have been made, then the method 100 returns to block 110 to identify any changes to the sensitive information contained in the electronic document. For example, sensitive information contained in the electronic document may have been added, removed, or altered. If the sensitive information contained in the electronic document has changed, then the redaction metadata and the rendering of the electronic document are accordingly updated.

At block 135, the collaborative editing system may present an overlay within the rendering of the electronic document showing how a particular piece of sensitive data would be displayed based on different access levels. For example, FIG. 2 depicts an exemplary overlay 220 showing that the name "First M. Last" would be displayed as (i) "First M. Last" for document owners/authorized editors, (ii) displayed as "XXXXX X. XXXX" for an intermediate access level, and (iii) displayed as "****" for a lowest access level. The overlay may be presented (e.g., displayed to the first user within the graphical user interface) based detecting a user action. For example, the overlay may be automatically presented after the collaborative editing system detects that the first user has selected or scrolled over a particular piece of data identified as sensitive. As depicted in FIG. 2**, the overlay may allow the first user (or other owner or authorized user of the electronic document) to edit how sensitive information is displayed to different users based on access level. The first user may also be able to indicate certain information should no longer be flagged as sensitive. Based on any edits to how the sensitive information should be displayed, the collaborative editing system may accordingly update the redaction metadata and the rendering of the electronic document.

In some embodiments, the first user may be able to use the graphical user interface to select information not already identified as sensitive and then indicate that such information should be treated as sensitive. Thereafter, the collaborative editing system may accordingly update the redaction metadata and the rendering of the electronic document.

In some embodiments, the first user may be able to use the graphical user interface to view how the electronic document would be viewed by users having different access levels. In this regard, the collaborative editing system may receive a request from first user to render the electronic document based on a particular access level (e.g., an intermediate access level or a lower access level). Thereafter, the collaborative editing system may update the rendering of the electronic document so that sensitive information is redacted based on how the redaction metadata indicates that sensitive information should be redacted in accordance with such particular access level.

In some embodiments, the collaborative editing system may detect if other users are accessing (e.g., viewing or editing) the electronic document and provide a notification (e.g., a notification within the graphical user interface) to the first user and/or to other owners/authorized editors of the electronic document that other users are accessing the electronic document.

Typically, the identification of sensitive information within the electronic document does not substantively change such sensitive information, but rather is only used to redact such sensitive information based on user access levels. That said, in some embodiments the collaborative editing system may allow the first user to permanently edit the electronic document to remove all or some sensitive information. For example, the first user may request that the collaborative editing system permanently remove sensitive information based on a particular access level. Once such sensitive information has been removed, the first user will typically be unable to view it.

The foregoing steps may be performed in real time or near real time. Accordingly, the first user may be able to nearly instantaneously see what information in the electronic document has been identified as being potentially sensitive.

Although the foregoing steps are described primarily with respect to the first user, once the electronic document has been created with the collaborative editing system, the steps described above may be performed for other authorized editors of the document.

Once the electronic document has been created, another user may request access to edit or view the electronic document. In this regard, at block 150 in FIG. 1, the collaborative editing system receives a request from a second computing device via a communication network to access the electronic document. In some embodiments, one or more users of the second computing device may be required to authenticate his/her identity using a user name, a passcode, a cookie, a biometric identifier, a private key, a token, and/or another authentication mechanism before being allowed to access the collaborative editing system or access the electronic document.

At block 155, the collaborative editing system typically retrieves the electronic document from the document database.

At block 160, the collaborative editing system typically identifies the user(s) associated with the second computing device. The user(s) associated with the second computing device are typically the user(s) accessing (e.g., editing or viewing) the electronic document via the second computing device. In some instances, the second computing device may be used by a single user to access the electronic document. Such a user of the second computing device may be identified by the collaborative editing system based on user authentication information or other identification information provided to the collaborative editing system. If such user's particular identity cannot be determined, the collaborative editing system may identify such user as an anonymous or untrusted user.

In some instances, the second computing device may be used by multiple users to access the electronic document. For example, the second computing device may be (i) hosting web conference, (ii) providing a live conference, presentation, or editing session, or (iii) sharing the electronic document through a social networking system. In some embodiments, the collaborative editing system may identify the users associated with the second computing device by receiving from the second computing device a list of users who might view or otherwise access the electronic document via the second computing device, such as a list of individuals signed up for a web conference, a list of individuals signed up for a live conference, or a list of users with whom the second computing device wishes to share the electronic document via a social networking system. In some embodiments, the collaborative editing system may identify the users associated with the second computing device by receiving from the second computing device a list of users currently viewing or otherwise accessing the second computing device, such as a list of individuals currently accessing a web conference or a list of individuals currently participating in a live conference, presentation, or editing session. In some embodiments, the second computing device may be associated with a particular location having one or more sensors (e.g., an access control reader, facial recognition system, or physical room counter) for identifying and/or counting individuals within the location. If so, the collaborative editing system may communication with such sensors to identify the individuals within the location. If a user's particular identity cannot be determined, the collaborative editing system may identify such user as an anonymous or untrusted user.

At block 165, the collaborative editing system determines an access level for each of the users associated with the second computing device. The access level for a particular user associated with the second computing device may be determined based on a social network relationship between such particular user and another user associated with the electronic document. The other user associated with the electronic document may be an owner or authorized editor of the electronic document, such as the first user. The other user associated with the electronic document may be an authorized user of the electronic document who is using the second computing device to share the electronic document with the particular user. For example, the other user may be using the second computing device to facilitate a web conference or live conference, and the particular user associated with the second computing device may be attending the conference. By way of further example, the other user may be using the second computing device to share the electronic document with the particular user via a social networking system. Typically, the social network relationship is based on the degree of the relationship between the particular user and the other user within a particular social network. In this regard, two users would have a first degree relationship if they are directly connected (e.g., are friends) within a social network, and two users would have a second degree relationship if they are not directly connected, but share a mutual connection (e.g., a mutual friend) within a social network. In other embodiments, the social network relationship may be based on: whether or not two users are members of the same group with a social network, whether or not one user has shared the electronic document with another user, common interests between two users, similar user profiles within a social network, or any other commonality between two users within a social network. Typically, the particular user will have a higher access level, if the particular user has a closer relationship with the other user (e.g., a first degree relationship will have a higher access level than a second degree relationship). The collaborative editing system typically determines the access level for each of the users associated with the second computing device based on receiving relationship information from one or more social networking systems. The collaborative editing system may determine the access level for each of the users based on default rules or based on rules customized by an authorized user of the collaborative editing system.

In addition to or alternatively to being based on social network relationship, the access level for each of the users associated with the second computing device may be based on other factors. For example, such access level may be based on whether or not a user of the second computing device is an authenticated user of the collaborative editing system. Each user may be required to provide authentication information (e.g., a user name, a passcode, a cookie, a biometric identifier, a private key, a token, and/or another authentication mechanism) to enable the collaborative editing system to authenticate the identity of such user. In this regard, the collaborative editing system may assign a higher access level for users that authenticated their identity and a lower access level to users whose identity the collaborative editing system is unable to authenticate.

Based on determining the access level for each of the users associated with the second computing device, at block 170, the collaborative editing system determines the lowest access level for the users associated with the second computing device. The collaborative editing system may determine the lowest access level based on default rules or based on rules customized by an authorized user of the collaborative editing system. By way of example, owners of the electronic document may have a highest access level (e.g., that provides unrestricted viewing and editing access); users with a first degree social network relationship with an owner may have a second highest access level (e.g., that provides for minimal redactions of sensitive information in the electronic document); users whose identity has been authenticated by the collaborative editing system (but who don't have a first degree social network relationship with an owner) may have a third highest access level (e.g., that provides for redaction of most sensitive information in the electronic document); and users identified as anonymous users may have a lowest access level (e.g., that provides for redaction of all sensitive information in the electronic document).

Next, at block 175, the collaborative editing system generates a rendering of the electronic document for display on the second computing device. Sensitive information is typically redacted based on the lowest determined access level for the user(s) of the second computing device and based on the redaction metadata, which typically identifies which information is sensitive and how such sensitive information is to be redacted, if at all, based on access level. To redact the sensitive information that should not be viewed based on the lowest determined access level, the collaborative editing system may replace such sensitive information in the electronic document with alternative text and/or images (e.g., based on alternative text and/or images specified by the redaction metadata) when generating the rendering for display on the second computing device. For example, the name "First M. Last" may be replaced by "XXXXX X. XXXX" or "****" in such rendering. That said, any way of making sensitive information unreadable is within the scope of the present invention. If the lowest access level for the user(s) of the second computing device is sufficiently high, then some, or even all, of the sensitive information in the electronic document may remain unredacted in the rendering of the electronic document for display on the second computing device. If the lowest access level for each of the users associated with the second computing device is that of an owner or authorized editor of the electronic document, then the second computing device may be provided complete access to the electronic document as described regarding FIG. 1**.

In some embodiments, unredacted sensitive information may be identified in the rendering as sensitive information. For example, when the collaborative editing system generates the rendering, the collaborative editing system may highlight, alter the font color, or otherwise alter the electronic document in a way that identifies sensitive information (e.g., based on information that the redaction metadata identifies as sensitive). In some embodiments, the collaborative editing system may present an overlay within the rendering of the electronic document showing how a particular piece of unredacted sensitive data would be displayed based on different access levels. This overlay may be presented based on detecting a user action.

At block 180, the collaborative editing system provides this rendering to the second computing device for display (e.g., via a graphical user interface (GUI) provided by the collaborative editing system to the second computing device).

The foregoing steps may be performed in real time or near real time. Accordingly, the user(s) of the second computing device may be able to nearly instantaneously see a redacted version of the electronic document based on their lowest access level.

Thereafter, the collaborative editing system will typically monitor the identities of the users of the second computing device (e.g., by regularly repeating block 160). If a change to the users of the second computing device is detected, then the collaborative editing system will typically update the rendering provided to the second computing device based on any change to the lowest access level associated with the users of the second computing device (e.g., by repeating the steps described with respect to blocks 165-180). For example, if a participant with the lowest access level leaves a web conference or live conference facilitated by the second computing device, then the rendering of the electronic document may be updated so certain information is no longer redacted. By way of further example, if a participant with a lower access level enters a web conference or live conference facilitated by the second computing device, then the rendering of the electronic document may be updated to redact additional sensitive information. According, the rendering of the electronic document may be updated in real time or near real time based on the lowest access level of the user(s) associated with the second computing device.

In some embodiments, an owner or authorized editor may change the content of the electronic document (e.g., to add or remove sensitive information) or may otherwise alter the redaction metadata (e.g., to change how sensitive data is to be redacted) while other users are viewing redacting versions of the electronic document. If there is any change to the redaction metadata, then the collaborative editing system may update the rendering provided to the second computing device (e.g., by repeating the steps described with respect to blocks 175-180). According, the rendering of the electronic document may be updated in real time or near real time based on any changes to the redaction metadata (e.g., to add or remove sensitive information or to change how sensitive data is to be redacted).

In some embodiments, only owners and authorized editors may be able to edit the content of the electronic document, and, thus, computing devices associated with users having lower access levels may only be able to view the electronic document based on the lowest access level of such users. That said, in other embodiments, computing devices associated with users having lower access levels may be able to edit the content of the electronic document. If a computing device associated with users having lower access levels edits the content of the electronic document, the collaborative editing system will typically identify any changes to sensitive information within the electronic document and, if so, appropriately update the redaction metadata and any renderings of the electronic document. In addition, if a computing device associated with users having lower access levels edits any redacted information, the collaborative editing system will typically preserve the original information as metadata for access by owners/authorized editors.

In view of the foregoing, the collaborative editing system typically allows the electronic document to be redacted based on user access level without altering the original version of the electronic document (e.g., the version of the electronic document saved in the document database). Moreover, the collaborative editing system typically allows the electronic document to be differently redacted for multiple devices concurrently accessing the electronic document based on the lowest access level of the users associated with each device. By way of example, if the collaborative editing system provides a single rendering of the electronic document to the presenter of a web conference or live conference to be viewed by all conference participants, then the rendering will be based on the lowest access level of all conference participants. That said, if the collaborative editing system separately renders the electronic document to an individual computing device (e.g., laptop, tablet computer, or smart phone) for each conference participant, then the electronic document may be rendered on each individual computing device based on the access level of such device's user, rather than based on the access levels of all conference participants.

As evident from the preceding description, the collaborative editing system represents an improvement in technology by providing for customized redaction of sensitive information from an electronic document in real time or near real time concurrently to different computing devices based on the lowest user access level associated with each computing device. Accordingly, the collaborative editing system provides a technical solution for overcoming the problems of: concurrently redacting an electronic document for different audiences, redacting an electronic document based on changes to audience participants, and redacting an electronic document based on social relationships.

Figure 3:
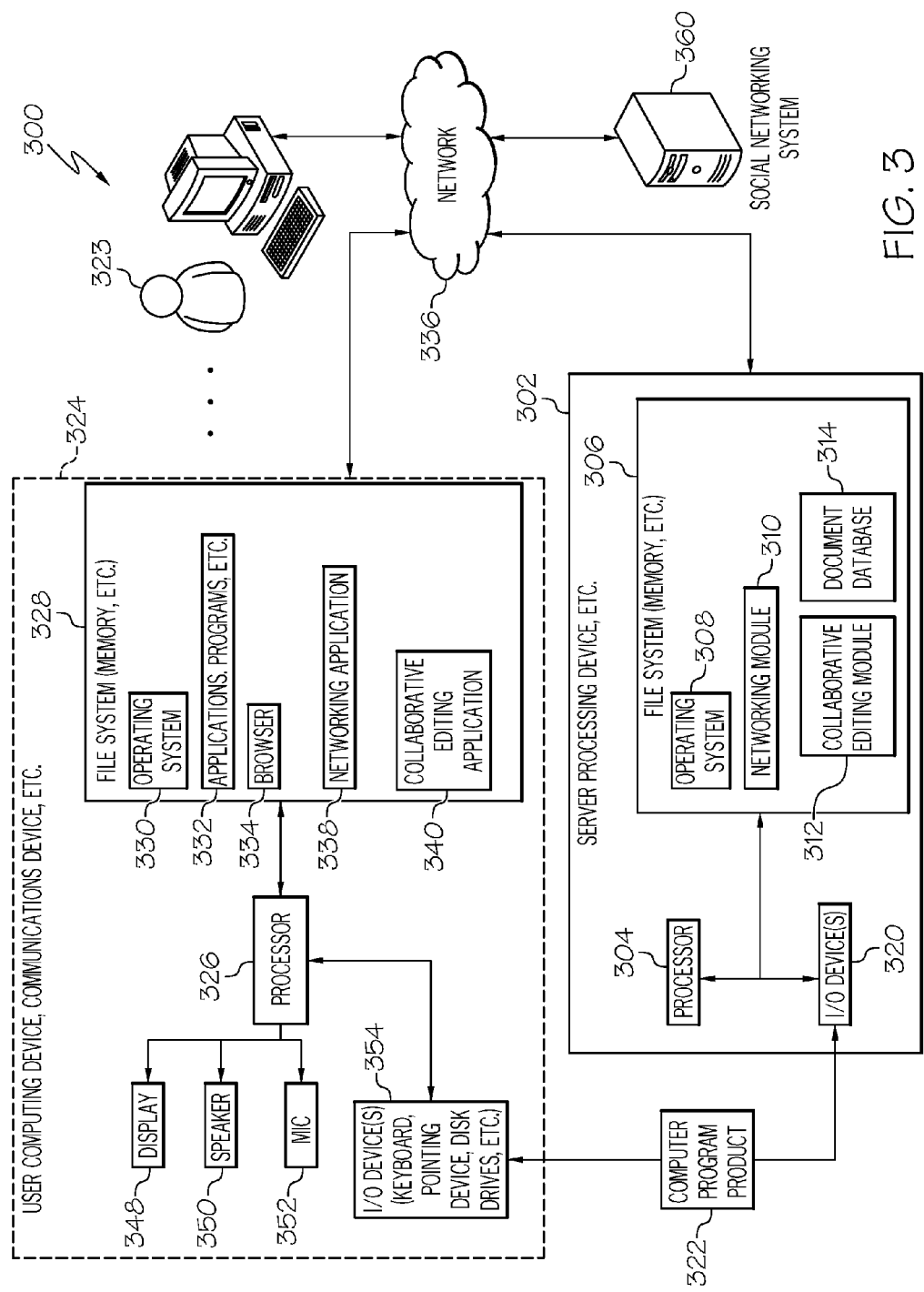
FIG. 3 is a block schematic diagram of an exemplary collaborative editing system in accordance with an embodiment of the present invention.

FIG. 3 is a block schematic diagram of an example of a system 300 for providing audience-based redaction of sensitive information in an electronic document in accordance with an embodiment of the present invention. The method 100 of FIG. 1 may be embodied in and performed by the system 300. The system 300 may include a collaborative editing system 302. The collaborative editing system 302 may be a server or similar processing device. The collaborative editing system 302 may include a processor 304 for controlling operation of the collaborative editing system 302 for performing functions, such as those described herein with respect to providing audience-based redaction of sensitive information in an electronic document. The collaborative editing system 302 may also include a file system 306 or memory. An operating system 308, applications and other programs may be stored on the file system 306 for running or operating on the processor 304. A networking module 310 or system may also be stored on the file system 306 and may be compiled and run on the processor 304 to perform the function of allowing the collaborative editing system 302 to communicate with other devices similar to those described herein. The networking module 310 may be any type of online communications mechanism for online communications or conversations.

A collaborative editing module 312 or system may also be stored on the file system 306. The method 100 of FIG. 1 may be embodied in the collaborative editing module 312 and may be performed by the processor 304 when the collaborative editing module 312 is compiled and run on the processor 304. The collaborative editing module 312 may operate in association with the networking module 310 and other types of communications media to perform the functions and operations associated with the method 100. In another embodiment, the collaborative editing module 312 may be a component of the networking module 310 and may operate in association with the networking module 310 and other communications media.

A document database 314 may also be stored on the file system 306. The document database 314 may be used by the collaborative editing module 312 to store electronic documents. In another embodiment, the document database 314 may be a component of the networking module 310.

The collaborative editing system 302 may also include one or more input devices, output devices or combination input/output devices, collectively I/O devices 320. The I/O devices 320 may include, but are not necessarily limited to, a keyboard or keypad, pointing device, such as a mouse, disk drive and any other devices to permit a user to interface with and control operation of the collaborative editing system 302 and to communicate with other devices and systems. For example, the collaborative editing system 302 may communicate with the social networking system 360 to determine the social network relationship between users. At least one of the I/O devices 320 may be a device to read a computer program product, such as computer program product 322. The computer program product 322 may be similar to that described in more detail herein. The networking module 310 and the collaborative editing module 312 may be loaded on the file system 3506 from a computer program product, such as computer program product 322.

A user 323 may use a computing device 324 or communications device to access the collaborative editing system 302, networking module 310 or collaborative editing module 312. The computing device 324 or communications device may be any sort of communications device including a mobile or handheld computer or communications device. The computing device 324 may include a processor 326 to control operation of the computing device 324 and a file system 328, memory or similar data storage device. An operating system 330, applications 332 and other programs may be stored on the file system 328 for running or operating on the processor 326. A web or Internet browser 334 may also be stored on the file system 328 for accessing the collaborative editing system 302 or server via a network 336. The network 336 may be the Internet, an intranet or other private or proprietary network.

A networking application 338 for may also be stored on the file system 328 and operate on the processor 326 of the computing device 324.

In accordance with an embodiment, a collaborative editing application 340 may also be stored on the file system 328. Aspects of the method 100 in FIG. 1 may be embodied and performed by the collaborative editing application 340. In accordance with another embodiment, the collaborative editing application 340 may be part of the networking application 338.

The collaborative editing application 340 operating on the computing device 324 may interface with or operate in conjunction with the collaborative editing module 312 on the collaborative editing system 302 to perform the functions and operations described herein for providing audience-based redaction of sensitive information in an electronic document. Accordingly, collaborative editing application 340 operating on the computing device 324 may perform some of the functions and operations of the method 100 and the collaborative editing module 312 operating on the collaborative editing system 302 may perform other functions of the method 100. Some embodiments of the present invention may include only the collaborative editing module 312 operating on the collaborative editing system 302, and other embodiments may include only the collaborative editing application 340 operating on the computing device 324. In some embodiment, the web or Internet browser 334 may interface with or operate in conjunction with the collaborative editing module 312 on the collaborative editing system 302 to perform the functions and operations described herein for providing audience-based redaction of sensitive information in an electronic document.

The computing device 324 may also include a display 348, a speaker system 350, and a microphone 352 for voice communications. One or more user interfaces may be presented on the display 348 for controlling operation of the computing device 324 (e.g., for controlling operation of the collaborative editing application 340) and for performing the operations and functions described herein.

The computing device 324 may also include one or more input devices, output devices or combination input/output devices, collectively I/O devices 354. The I/O devices 354 may include a keyboard or keypad, pointing device, such as a mouse, disk drives and any other devices to permit a user, such as user 323, to interface with and control operation of the computing device 324 and to access collaborative editing application 340 and/or collaborative editing module 312 on the collaborative editing system 302. The I/O devices 354 may also include at least one device configured to read computer code from a computer program product, such as computer program product 322.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, when it is said herein that something is "based on" something else, it may be based on one or more other things as well. In other words, unless expressly indicated otherwise, as used herein "based on" means "based at least in part on" or "based at least partially on."

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A computerized method for providing audience-based redaction of sensitive information in an electronic document, comprising:
   receiving, by a computer processor, a request from a first user via a first computing device to create a first electronic document;
   creating, by a computer processor, the first electronic document and storing the first electronic document in a document database;
   based on redaction rules, automatically searching, by a computer processor, the first electronic document to identify sensitive information, the sensitive information comprising first sensitive data;
   based on searching the first electronic document to identify the sensitive information, creating, by a computer processor, redaction metadata, wherein the first electronic document comprises the redaction metadata identifying the sensitive information and required access levels;
   receiving, by a computer processor, a request from a second computing device to access the first electronic document stored in the document database;
   retrieving, by a computer processor, the first electronic document from the document database;
   identifying, by a computer processor, one or more users associated with the second computing device;
   based on identifying the one or more users associated with the second computing device, determining, by a computer processor, an access level for each of the one or more users associated with the second computing device, wherein determining the access level for each of the one or more users associated with the second computing device is further based on determining a social network relationship between the first user and the one or more users associated with the second computing device;
   based on determining the access level for each of the one or more users associated with the second computing device, determining, by a computer processor, a weakest access level for the one or more users associated with the second computing device;
   creating, by a computer processor, a rendering of the first electronic document, wherein the rendering of the first electronic document is created by redacting the first sensitive data from the first electronic document based on the redaction metadata and the weakest access level for the one or more users associated with the second computing device;
   providing, by a computer processor, the rendering of the first electronic document to the second computing device for display;
   receiving, by a computer processor, an edit to the redacted first sensitive data of the first electronic document from the second computing device;
   based on receiving the edit, updating, by a computer processor, the redaction metadata to preserve the first sensitive data; and
   updating, by a computer processor, the rendering of the first electronic document based on the edit to the redacted first sensitive data.

2. The method of claim 1, wherein:
   a first access level has a right to view the first sensitive data, and a second access level does not have a right to view the first sensitive data; and
   the weakest access level for the one or more users associated with the second computing device is the second access level.

3. The method of claim 2, wherein:
   the sensitive information of the first electronic document comprises second sensitive data;
   the first access level has a right to view the second sensitive data, and the second access level has a right to view the second sensitive data; and
   creating the rendering of the first electronic document comprises not redacting the second sensitive data from the first electronic document based on the weakest access level for the one or more users associated with the second computing device being the second access level.

4. The method of claim 3, comprising:
receiving a request from a third computing device to access the first electronic document;
identifying, by a computer processor, one or more users associated with the third computing device;
based on identifying the one or more users associated with the third computing device, determining, by a computer processor, an access level for each of the one or more users associated with the third computing device, wherein determining the access level for each of the one or more users associated with the third computing device is further based on determining a social network relationship between the first user and the one or more users associated with the third computing device;
based on determining the access level for each of the one or more users associated with the third computing device, determining, by a computer processor, a weakest access level for the one or more users associated with the third computing device, the weakest access level for the one or more users associated with the third computing device being a third access level, the third access level does not have a right to view the first sensitive data or the second sensitive data;
creating, by a computer processor, a second rendering of the first electronic document, wherein the second rendering of the first electronic document is created by redacting the first sensitive data and the second sensitive data from the first electronic document based on the weakest access level for the one or more users associated with the third computing device being the third access level; and
providing the second rendering of the first electronic document to the third computing device for display.

5. The method of claim 2, comprising:
determining that the weakest access level for the one or more users associated with the second computing device has changed; and
based on determining that the weakest access level for the one or more users associated with the second computing device has changed, updating the rendering of the first electronic document.

6. The method of claim 1, comprising:
receiving a second edit to the first electronic document from the first user via the first computing device;
based on receiving the second edit, automatically searching the first electronic document to identify changes to the sensitive information;
based on identifying changes to the sensitive information, updating the redaction metadata and updating the rendering of the first electronic document.

7. The method of claim 1, wherein the one or more users associated with the second computing device comprise a plurality of users.

* * * * *